(12) United States Patent
Schroeder et al.

(10) Patent No.: US 9,825,995 B1
(45) Date of Patent: Nov. 21, 2017

(54) COORDINATED APPLICATION OF SECURITY POLICIES

(71) Applicant: Shape Security, Inc., Palo Alto, CA (US)

(72) Inventors: Carl Schroeder, Los Altos, CA (US); Justin D. Call, Santa Clara, CA (US); Siying Yang, Cupertino, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

(21) Appl. No.: 14/596,944

(22) Filed: Jan. 14, 2015

(51) Int. Cl.
*H04L 29/06* (2006.01)

(52) U.S. Cl.
CPC .................. *H04L 63/205* (2013.01)

(58) Field of Classification Search
CPC ..................................... H04L 63/205
USPC ............................................... 726/1
See application file for complete search history.

(56) References Cited

U.S. PATENT DOCUMENTS

| | | | |
|---|---|---|---|
| 6,266,684 B1 | 7/2001 | Kraus | |
| 7,424,720 B2 | 9/2008 | Chagoly | |
| 7,480,385 B2 | 1/2009 | Weber | |
| 7,707,223 B2 | 4/2010 | Zubenko et al. | |
| 7,836,425 B2 | 11/2010 | Rubin et al. | |
| 7,895,653 B2 | 2/2011 | Calo et al. | |
| 8,020,193 B2 | 9/2011 | Bhola et al. | |
| 8,170,020 B2 | 5/2012 | Oliver et al. | |
| 8,200,958 B2 | 6/2012 | Coppola et al. | |
| 8,266,202 B1 | 9/2012 | Colton et al. | |
| 9,075,990 B1 | 7/2015 | Yang | |
| 9,104,878 B1 | 8/2015 | Khairetdinov | |
| 9,275,222 B2 | 3/2016 | Yang | |
| 9,456,050 B1 | 9/2016 | Lepeska | |
| 9,563,929 B1 | 2/2017 | Sokolowski | |
| 2002/0016918 A1 | 2/2002 | Tucker | |
| 2002/0099827 A1 | 7/2002 | Shah et al. | |
| 2004/0162994 A1 | 8/2004 | Cohen et al. | |
| 2004/0245525 A1 | 12/2004 | Yamazaki et al. | |
| 2005/0172338 A1 | 8/2005 | Sandu | |
| 2005/0198099 A1 | 9/2005 | Motsinger | |
| 2005/0204348 A1 | 9/2005 | Horning | |

(Continued)

FOREIGN PATENT DOCUMENTS

| | | |
|---|---|---|
| WO | WO 2013/091709 | 6/2013 |
| WO | WO 2017/074622 | 5/2017 |

OTHER PUBLICATIONS

Detecting and Preventing Drive-By Download Attack via Participative Monitoring of the Web, Jul. 23, 2013.

(Continued)

*Primary Examiner* — Jacob Lipman

(57) ABSTRACT

A computer-implemented method includes receiving, at a first server sub-system, content served to a client computing device; transcoding, with the first server sub-system, the received content using a policy received from a second security sub-system; determining, with the first server sub-system that the second server sub-system has likely ceased operating properly; receiving a request to vote on a leader server sub-system from one or more server sub-systems, and voting for from of the one or more server sub-systems; and subsequently transcoding received content according to a policy received from another of the server sub-systems that is not the second server sub-system.

20 Claims, 9 Drawing Sheets

(56) References Cited

U.S. PATENT DOCUMENTS

| | | | |
|---|---|---|---|
| 2005/0216770 A1 | 9/2005 | Rowett | |
| 2006/0212932 A1 | 9/2006 | Patrick | |
| 2006/0230288 A1 | 10/2006 | Fox | |
| 2007/0011295 A1 | 1/2007 | Hansen | |
| 2007/0083933 A1 | 4/2007 | Venkatapathy | |
| 2008/0222736 A1 | 9/2008 | Boodaei et al. | |
| 2008/0250310 A1 | 10/2008 | Chen | |
| 2009/0144829 A1 | 6/2009 | Grigsby et al. | |
| 2009/0249310 A1 | 10/2009 | Meijer et al. | |
| 2010/0088404 A1 | 4/2010 | Mani | |
| 2010/0100927 A1 | 4/2010 | Bhola et al. | |
| 2010/0106611 A1 | 4/2010 | Paulsen | |
| 2010/0142382 A1 | 6/2010 | Jungck et al. | |
| 2010/0180346 A1 | 7/2010 | Nicolson | |
| 2010/0218253 A1 | 8/2010 | Sutton | |
| 2010/0235636 A1 | 9/2010 | Cohen | |
| 2010/0257354 A1 | 10/2010 | Johnston et al. | |
| 2010/0272094 A1* | 10/2010 | Byard | H04W 84/20 370/350 |
| 2011/0173526 A1 | 7/2011 | Schwarzbauer | |
| 2011/0231305 A1 | 9/2011 | Winters | |
| 2011/0255689 A1 | 10/2011 | Bolotov | |
| 2011/0296391 A1 | 12/2011 | Gass et al. | |
| 2011/0320816 A1 | 12/2011 | Yao | |
| 2012/0022942 A1 | 1/2012 | Holloway et al. | |
| 2012/0096116 A1 | 4/2012 | Mislove et al. | |
| 2012/0124372 A1 | 5/2012 | Dilley et al. | |
| 2012/0159193 A1 | 6/2012 | Spradlin et al. | |
| 2012/0254727 A1 | 10/2012 | Jain | |
| 2013/0031037 A1 | 1/2013 | Brandt | |
| 2013/0091582 A1 | 4/2013 | Chen et al. | |
| 2013/0198607 A1 | 8/2013 | Mischook et al. | |
| 2013/0232234 A1 | 9/2013 | Kapur et al. | |
| 2013/0273882 A1 | 10/2013 | Walsh | |
| 2014/0040051 A1 | 2/2014 | Ovick | |
| 2014/0089786 A1 | 3/2014 | Hashmi | |
| 2014/0245394 A1* | 8/2014 | Abuelsaad | H04L 63/104 726/4 |
| 2014/0289830 A1 | 9/2014 | Lemaster | |
| 2014/0310392 A1 | 10/2014 | Ho | |
| 2015/0058992 A1 | 2/2015 | El-Moussa | |
| 2015/0067031 A1 | 3/2015 | Acharya | |
| 2015/0235362 A1 | 8/2015 | Ghosh | |
| 2015/0262183 A1 | 9/2015 | Gervais | |
| 2015/0378876 A1 | 12/2015 | Ji | |
| 2016/0005029 A1 | 1/2016 | Ivey | |
| 2016/0191351 A1 | 6/2016 | Smith | |
| 2017/0118241 A1 | 4/2017 | Call | |

OTHER PUBLICATIONS

In Search of an Understandable Consensus Algorithm, 2014 USENIX Annual Technical Conference, Jun. 19, 2014, 305-319, Proceedings of USENIX Annual Technical Conference 2014, USENIX.
In Search of an Understandable Consensus Algorithm (Extended Version), May 20, 2014.
NOA, dated Feb. 16, 2017, re: Justin D. Call, U.S. Appl. No. 14822287, filed on Aug. 10, 2015.
NOA, dated Mar. 10, 2017, re: Roger S. Hoover, U.S. Appl. No. 14/470,082, filed on Aug. 27, 2014.
CTNF, dated Mar. 10, 2017, re: Justin D. Call, U.S. Appl. No. 14/922,436, filed on Oct. 26, 2015.
CTNF, dated Mar. 9, 2017, re: Siying Yang, U.S. Appl. No. 14/925,547, filed on Oct. 28, 2015.
NOA, dated Mar. 16, 2017, re: Siying Yang, U.S. Appl. No. 15/052,951, filed on Feb. 25, 2016.
CTFR, dated Apr. 9, 2015, re: Justin Call, U.S. Appl. No. 14/055,704, filed on Oct. 16, 2013.
CTFR, dated Dec. 4, 2014, re: Justin Call, U.S. Appl. No. 14/055,704, filed on Oct. 16, 2013.
CTFR, dated Dec. 30, 2013, re: Justin Call, U.S. Appl. No. 14/055,704, filed on Oct. 16, 2013.
CTFR, dated Apr. 22, 2014, re: Justin Call, U.S. Appl. No. 14/055,704, filed on Oct. 16, 2013.
CTFR, dated Sep. 25, 2015, re: Marc Hansen, U.S. Appl. No. 14/055,714, filed on Oct. 16, 2013.
CTFR, dated Mar. 16, 2015, re: Marc Hansen, U.S. Appl. No. 14/055,714, filed on Oct. 16, 2013.
NOA, dated Jan. 13, 2016, re: Marc Hansen, U.S. Appl. No. 14/055,714, filed on Oct. 16, 2013.
CTFR, dated Apr. 10, 2014, re: Oscar Steele, U.S. Appl. No. 14/160,105, filed on Jan. 21, 2014.
NOA, dated Oct. 17, 2014, re: Oscar Steele, U.S. Appl. No. 14/160,105, filed on Jan. 21, 2014.
CTFR, dated Sep. 1, 2015, re: Ariya Hidayat, U.S. Appl. No. 14/293,895, filed on Jun. 2, 2014.
NOA, dated Mar. 30, 2016, re: Ariya Hidayat, U.S. Appl. No. 14/293,895, filed on Jun. 2, 2014.
CTFR, dated Feb. 22, 2017, re: Subramanian Varadarajan, U.S. Appl. No. 14/320,403, filed on Jun. 30, 2014.
CTFR, dated Oct. 9, 2014, re: Siying Yang, U.S. Appl. No. 14/321,172, filed on Jul. 1, 2014.
NOA, dated Mar. 30, 2015, re: Siying Yang, U.S. Appl. No. 14/321,172, filed on Jul. 1, 2014.
CTFR, dated Jun. 24, 2016, re: Roger Hoover, U.S. Appl. No. 14/470,082, filed on Aug. 27, 2014.
CTFR, dated Aug. 28, 2015, re: Roger Hoover, U.S. Appl. No. 14/470,082, filed on Aug. 27, 2014.
CTFR, dated Dec. 1, 2016, re: Oscar Steele, U.S. Appl. No. 14/481,663, filed on Sep. 9, 2014.
CTFR, dated Jan. 2, 2015, re: Timothy Peacock, U.S. Appl. No. 14/503,346, filed on Sep. 30, 2014.
NOA, dated Apr. 10, 2015, re: Timothy Peacock, U.S. Appl. No. 14/503,346, filed on Sep. 30, 2014.
CTFR, dated Dec. 14, 2015, re: Oscar Steele, U.S. Appl. No. 14/542,994, filed on Nov. 17, 2014.
NOA, dated Mar. 28, 2016, re: Oscar Steele, U.S. Appl. No. 14/542,994, filed on Nov. 17, 2014.
CTFR, dated Dec. 28, 2016, re: Siying Yang, U.S. Appl. No. 14/570,466, filed on Dec. 15, 2014.
CTNF, dated Apr. 21, 2016, re: Siying Yang, U.S. Appl. No. 14/570,466, filed on Dec. 15, 2014.
CTNF, dated May 6, 2015, re: Timothy Peacock, U.S. Appl. No. 14/570,632, filed on Dec. 15, 2014.
NOA, dated Dec. 18, 2015, re: Timothy Peacock, U.S. Appl. No. 14/570,632, filed on Dec. 15, 2014.
NOA, dated Dec. 7, 2016, re: Carl Schroeder, U.S. Appl. No. 14/596,944, filed on Jan. 1, 2015.
CTNF, dated May 12, 2016, re: Carl Schroeder, U.S. Appl. No. 14/596,944, filed on Jan. 1, 2015.
CTNF, dated Apr. 22, 2016, re: Justin Call, U.S. Appl. No. 14/602,038, filed on Jan. 21, 2015.
NOA, dated Sep. 19, 2016, re: Justin Call, U.S. Appl. No. 14/602,038, filed on Jan. 1, 2015.
CTNF, dated Oct. 7, 2015, re: Roger Hoover, U.S. Appl. No. 14/713,493, filed on May 15, 2015.
NOA, dated Oct. 23, 2015, re: Siying Yang, U.S. Appl. No. 14/790,738, filed on Jul. 2, 2015.
CTNF, dated Jul. 18, 2016, re: Justin Call, U.S. Appl. No. 14/822,287, filed on Aug. 10, 2015.
CTNF, dated Oct. 7, 2016, re: Siying Yang, U.S. Appl. No. 15/052,951, filed on Feb. 25, 2016.
NOA, dated Mar. 29, 2017, re: Siying Yang, U.S. Appl. No. 15/052,951, filed on Feb. 25, 2016.
NOA, dated Apr. 11, 2017, re: Siying Yang, U.S. Appl. No. 15/052,951, filed on Feb. 25, 2016.
CTNF, dated Dec. 16, 2016, re: Marc Hansen, U.S. Appl. No. 15/148,139, filed on May 6, 2016.
International Search Report, dated Feb. 16, 2017, PCT/US16/53472.
International Search Report, dated Dec. 30, 2016, PCT/US16/53392.
International Search Report, dated Aug. 14, 2014, PCT/US14/27805.
International Search Report, dated Jul. 18, 2014, PCT/US14/23897.

(56) References Cited

OTHER PUBLICATIONS

NOA, dated May 22, 2017, re: Roger S. Hoover, U.S. Appl. No. 14/713,493, filed on May 15, 2015.
CTNF, dated Jun. 2, 2017, re: Ariya Hidayat, U.S. Appl. No. 15/224,987, filed on Aug. 1, 2016.
NOA, dated Jun. 30, 2017, re: Roger S. Hoover, U.S. Appl. No. 14/713,493, filed on May 15, 2015.
NOA, dated Jun. 9, 2017, re: Carl Schroeder, U.S. Appl. No. 14/596,944, filed on Jan. 14, 2015.
NOA, dated Jun. 20, 2017, re: Roger S. Hoover, U.S. Appl. No. 14/470,082, filed on Aug. 27, 2014.
NOA, dated Jun. 20, 2017, re: Siying Yang, U.S. Appl. No. 15/052,951, filed on Feb. 25, 2016.
CTNF, dated Aug. 14, 2017, re: Marc R. Hansen, U.S. Appl. No. 15/148,139, filed on May 6, 2016.
CTNF, dated Aug. 11, 2017, re: Oscar H. Steele III, U.S. Appl. No. 15/224,985, filed on Aug. 1, 2016.
NOA, dated Aug. 29, 2017, re: Siying Yang, U.S. Appl. No. 15/052,951, filed on Feb. 25, 2016.
NOA, dated Aug. 29, 2017, re: Roger S. Hoover, U.S. Appl. No. 14/713,493, filed on May 15, 2015.

* cited by examiner

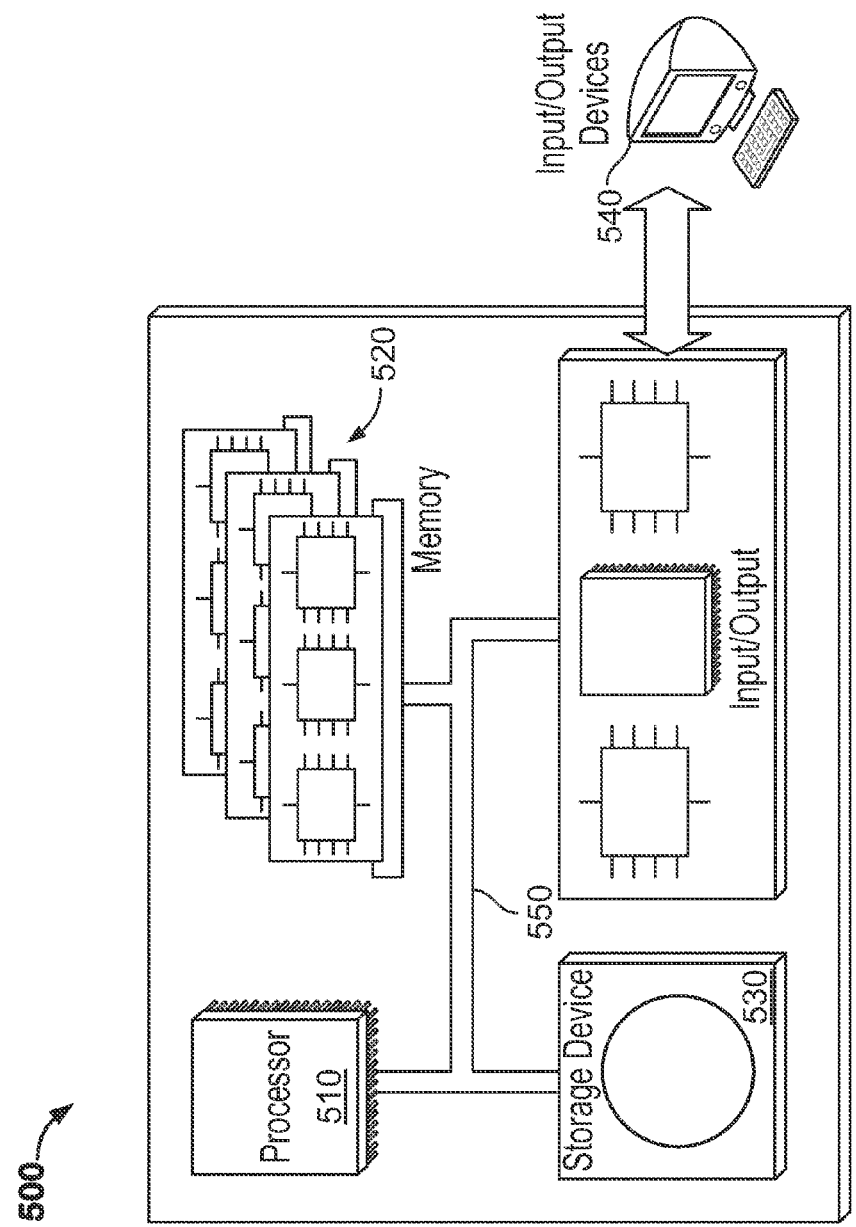

COORDINATED APPLICATION OF SECURITY POLICIES

TECHNICAL FIELD

This document relates to systems and techniques for interfering with the operation of computer malware via coordination of security countermeasure sub-systems, as a mechanism for improving computer system security.

BACKGROUND

Much of our commerce now occurs in the form of e-commerce, through computer users who access services over the Internet and using the World Wide Web. Because this commerce involves money, it draws unsavory characters to its periphery—in the form of fraudsters. The goal of such people is to intercept or otherwise interfere with the activities of legitimate commerce so as to identify confidential information like account numbers, passwords, user IDs, and the like, as a mechanism toward stealing money from such users or from the organizations that provide services to such users. For example, through a technique known as a "Man in the Browser" attack, malware (i.e., malicious software, used, for example, to disrupt computer operation, improperly gather sensitive information, or improperly gain access to private computer systems) may be loaded on a client computer and may attempt to intercept information such as account numbers and passwords where a user interacts with a banking site, or passwords and credit card information when the user interacts with an on-line retail store.

Various approaches have been taken to identify and prevent such malicious activity. For example, some approaches install defensive software on client computers. Alternative approaches run various kinds of analysis tools on the transactions and/or network traffic on a server system to detect improper activity.

SUMMARY

This document describes systems and techniques by which web code (e.g., HTML, CSS, and JavaScript) is modified before it is served over the Internet by a server system, so as to make more difficult the exploitation of the code and the server system by clients that receive the code (e.g., various computers such as desktops, laptops, tablets, and smartphones), including clients that are infected by malware without their users' knowledge. In certain implementations discussed below, codes served by a web server system can be analyzed and a map or template may be generated to permit polymorphic alteration of the code, meaning that the same code is altered in different ways for different times that it is served (either to different people or at different times to a single person).

In large-scale implementations, multiple different servers may be employed to perform such transcoding of the served content (e.g., to provide redundancy, fail-over protection, and scalability). It may be necessary to have all such servers working in close coordination with each other. For example, reverse transcoding may need to be performed on requests from clients that have been served transcoded content. In such a situation, various servers may coordinate with each other, such as by accessing a database that tracks state for particular clients that have been served code. Or the coordination may be stateless, such as by using an intermediary device to include with the served content an indicator of the type of transformation that was performed on that content (e.g., putting a key in a served cookie), and another intermediary device that receives client requests with the stored values for such indicators from respective clients with the requests, and using such values as key for the reverse transcoding. Also, security countermeasures that are applied to served content may change over time as a system adapts to security threats, and it may be necessary for an intermediary device that receives requests from a client device to know what security countermeasures were applied to the content for the device, and such a determination may be made using the techniques just discussed, so as to maintain synchronizations between outgoing countermeasures applied and processing of incoming requests made from content to which the countermeasures were applied.

As described in more detailed below, such server systems may work in a peer-to-peer manner to coordinate their own activities with each other. In particular, one of the servers may be made a leader of the other servers, and may periodically (e.g., multiple times per second) transmit to the other servers the latest information about the security policies to be applied to content that they transcode, and also status information about the cohort of servers, such as the number of servers currently active in the cohort. The various servers may transmit back to the leader information about their status or other information (e.g., so that the leader may update the number of active servers if one server goes down and does not transmit to the leader for a certain period of time). The following servers may be programmed to expect a communication from the leader on a certain schedule and may operate timers that, if they expire without a particular server receiving a regular communication from the leader, may cause such time-expired server or servers to elect a new leader in a quick and consensus-directed manner. In particular, each server may wait a random or determined delay period after its timer expires and may then nominate itself to the other servers to become the leader. Each such server can then be programmed to vote for the first nomination it receives, and send that vote back to the nominating server, with the servers further programmed to take leader status if they receive a majority of the votes, based on the known number of available servers in the cohort.

The disclosed processes and systems may provide a number of technical advantages that improve the operation of a computing system, in certain implementations. For example, a large-scale computer system may provide a fully-coordinated approach to serving secured content, even where multiple transactions need to be performed and spread over time so that direct coordination is required to ensure that the transactions for one client session are carried out in a consistent manner. Also, resources may be added to a cohort to adapt to growing or shrinking demand for security service. Such an approach may thus allow a group of servers to be shared among many different customers for computing services (e.g., many different web sites or many different organizations that operate different web sites), with the load being able to shift readily from one to another. Also, failures of servers may be observed reliably and without a need for centralized management, and with sub-second speed. In addition, the need for a central manager for the server assignment process can be avoided in particular implementations.

In one implementation, a computer-implemented method is disclosed that comprises receiving, at a first server sub-system, content served to a client computing device; transcoding, with the first server sub-system, the received content using a policy received from a second security sub-system; determining, with the first server sub-system that the second server sub-system has likely ceased operating properly; submitting, by the first server system and to a plurality of other server sub-systems, a self-nomination for the first server sub-system to be elected a leader to replace the second server sub-system; receiving, from at least some of the other server sub-systems, votes in favor of the self-nomination by the first server sub-system; determining that a majority of the other server sub-systems have voted in favor of the self-nomination by the first server sub-system; and transmitting to the other server sub-systems, a security policy stored by the first server sub-system as a result of determining that the majority of the other server sub-systems voted in favor of the self-nomination by the first server sub-system.

In some aspects, the method also includes subsequently transcoding received content according to a policy received from another of the server sub-systems that is not the second server sub-system. In addition, the method may comprise selecting one or more security countermeasures from a list of available countermeasures or groups of countermeasure, using the policy, and receiving an indicator of a number of servers in a system that includes the first server sub-system before determining that the second server sub-system has likely ceased operating properly, and using the indicator in determining whether a majority of the other server sub-systems have voted in favor of the self-nomination by the first server sub-system. Moreover, the method may comprise transmitting, to client devices, an identifier of the policy and transformed content requested from a web server system by the clients, and may also include recovering from an operational failure, transmitting to the other server sub-systems an indication that recovery has occurred, and subsequently processing content server to the client computing devices using a policy received from one of the other server sub-systems. In addition, the method may include adjusting a manner in which content served to the client computer devices is transformed, in response to receiving an indication that one of the other server sub-systems has likely failed.

In another implementation, a computer-implemented method is disclosed that comprises receiving, at a first server sub-system, content served to a client computing device; transcoding, with the first server sub-system, the received content using a policy received from a second security sub-system; determining, with the first server sub-system that the second server sub-system has likely ceased operating properly; receiving a request to vote on a leader server sub-system from one or more server sub-systems, and voting for from of the one or more server sub-systems; and subsequently transcoding received content according to a policy received from another of the server sub-systems that is not the second server sub-system. The method may also comprise selecting and applying, in serving content, one or more security countermeasures from a list of available countermeasures or groups of countermeasure, using the policy. Moreover, the system may comprise receiving an indicator of a number of servers in a system that includes the first server sub-system before determining that the second server sub-system has likely ceased operating properly, and using the indicator in determining whether a majority of the other server sub-systems have voted in favor of the self-nomination by the first server sub-system.

In some aspects, the method also comprises transmitting, to client devices, (a) an identifier of the policy and (b) transformed content requested from a web server system by the clients. In addition, the method can include recovering from an operational failure, transmitting to the other server sub-systems an indication that recovery has occurred, and subsequently processing content server to the client computing devices using a policy received from one of the other server sub-systems. Also, the system can include adjusting a manner in which content served to the client computer devices is transformed, in response to receiving an indication that one of the other server sub-systems has likely failed.

In yet another implementation, a computer implemented system is disclosed. The system comprises a plurality of security intermediary servers arranged to connect between origin content servers and client computing devices that request content form the origin content servers, each of the security intermediary servers having one or more processors, and tangible storage that stores instructions that when executed perform operations comprising: processing content server from the origin server systems to the client computing device using a security policy received from another of the security intermediary servers; waiting for communications from a first of the plurality of security intermediary servers that include updated security policy information; transmitting to the other security intermediary servers self-nominations when communications from the first of the plurality of security intermediary servers; and responding to self-nominations from others of the security intermediary servers by voting to make a leader out of a security intermediary server whose self-nomination is first received before other self-nominations from others of the security intermediary servers. The security intermediary servers can be programmed to select, and apply when serving content, one or more security countermeasures from a list of available countermeasures or groups of countermeasure, using the policy. Also, the security intermediary servers may be programmed to: (a) receive an indicator of a number of servers in a system that includes the first server sub-system before determining that the second server sub-system has likely ceased operating properly, and (b) use the indicator in determining whether a majority of the other server sub-systems have voted in favor of the self-nomination by the first server sub-system.

In some aspects, security intermediary servers are programmed to transmit, to client devices, an identifier of the policy and transformed content requested from a web server system by the clients. In addition, the server can be programmed to recover from an operational failure, transmit to the other server sub-systems an indication that recovery has occurred, and subsequently process content served to the client computing devices using a policy received from one of the other server sub-systems. And yet in other aspects, the security intermediary servers are programmed to adjust a manner in which content served to the client computer devices is transformed, in response to receiving an indication that one of the other security intermediary servers has likely failed.

The details of one or more embodiments are set forth in the accompanying drawings and the description below. Other features and advantages will be apparent from the description and drawings, and from the claims.

DESCRIPTION OF DRAWINGS

FIG. 5 shows an example computer system.

Like reference symbols in the various drawings indicate like elements.

DETAILED DESCRIPTION

Figure 1A:
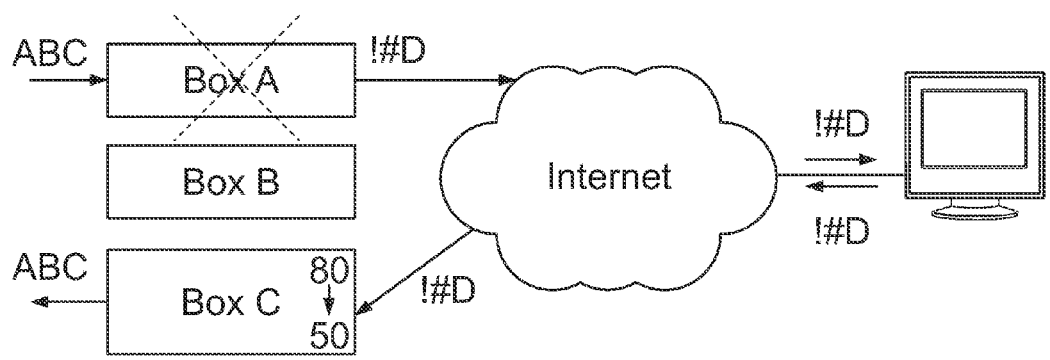
FIGS. 1A-1C are conceptual diagrams showing cooperative management of security countermeasures in a multi-server computer environment.

Described below are systems and techniques for deflecting and detecting malware activity on client devices to which a server system serves computer code. The examples discussed below may also be used in other settings to insert security countermeasures into a content serving system. The particular examples discussed here involve, among other things, performing analysis on content before the content is called to be served to the client. Such analysis can allow the content to be compressed through minification, and also permit the insertion of security countermeasures into the content. The minification may be beneficial in reducing the network bandwidth required to serve the content. The countermeasures may help a content provider avoid having its customers or its own computers exploited by malware, such as malware that attempts to obtain confidential information from the site or the customers' client computers.

The security server system may employ a number of servers or server sub-systems (each referenced simply as servers here unless otherwise noted) that operate in close coordination with each other, such as by applying the same set of security countermeasures or other particular security policies and security policy parameters. For example, the system may be programmed to apply transcoding to content that is served down to client devices, and corresponding reverse transcoding to requests that are received up from the clients (under the assumption that the requests may include strings of characters that were previously transcoded and cannot be passed to the content server that initially served the string, unless the string is reverted to its original form). Such a system may periodically change the keys or algorithms it uses to transcode the content, so as to provide a more difficult-to-hit target for malware. Each request for content can be passed through one of the available servers in such a system, and the subsequent request can be passed through another if the servers are coordinated and are applying the same security policy.

To that end, the servers may coordinate with each other, and without the need of a central coordinator, by electing one of the servers as a leader that then periodically distributes the current security policy and other relevant information such as information indicating how many servers are currently operating in the group of servers. If that leader goes down, the other servers may detect it by not having received an update from the leader for a certain period of time, and each of such following servers may send a communication to the other servers as a result, effectively nominating itself as the leader. Each such server may apply a certain delay after time for not hearing from the leader has expired, so as to make "collisions" between the different servers less likely—i.e., to make it less likely two servers will seek a nomination simultaneously. Each server may then "vote" for the first other active server from which it received a self-nomination, and any server that receives positive responses from a number of other servers that is a majority of the known operating servers will make itself the new leader, and begin sending its latest version of the security policy and system information to the other servers. The process then repeats continuously, with the leader staying the leader as long as it can serve the role (and adding new followers as they come on-line, and also receiving policy updates from an administrator as relevant), and the remaining servers electing new leaders as necessary.

Figure 1B:
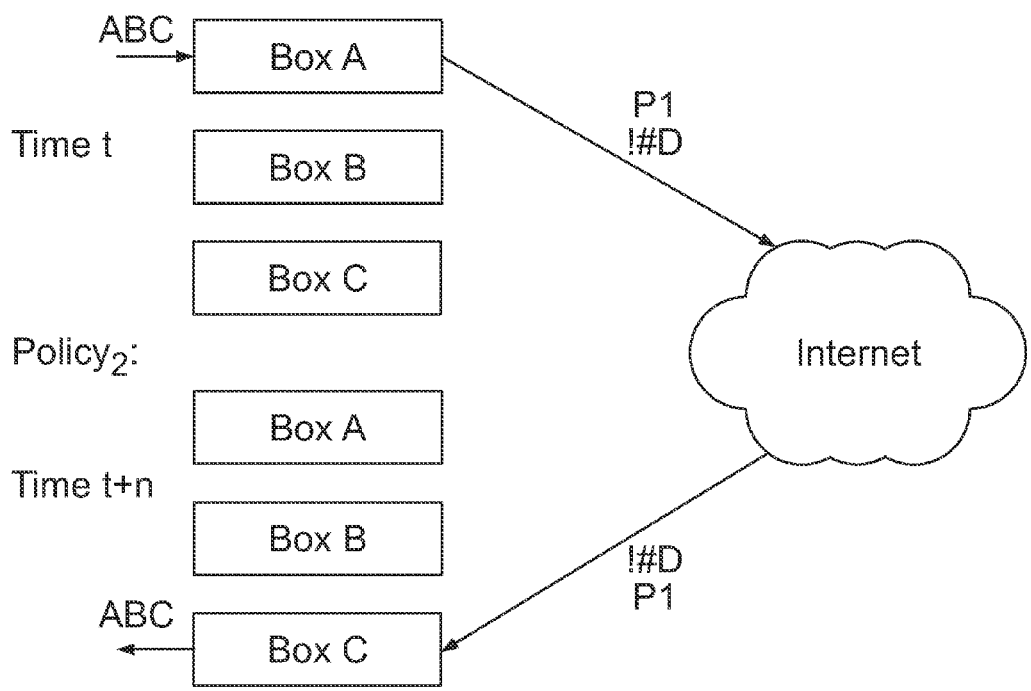
Figure 1C:
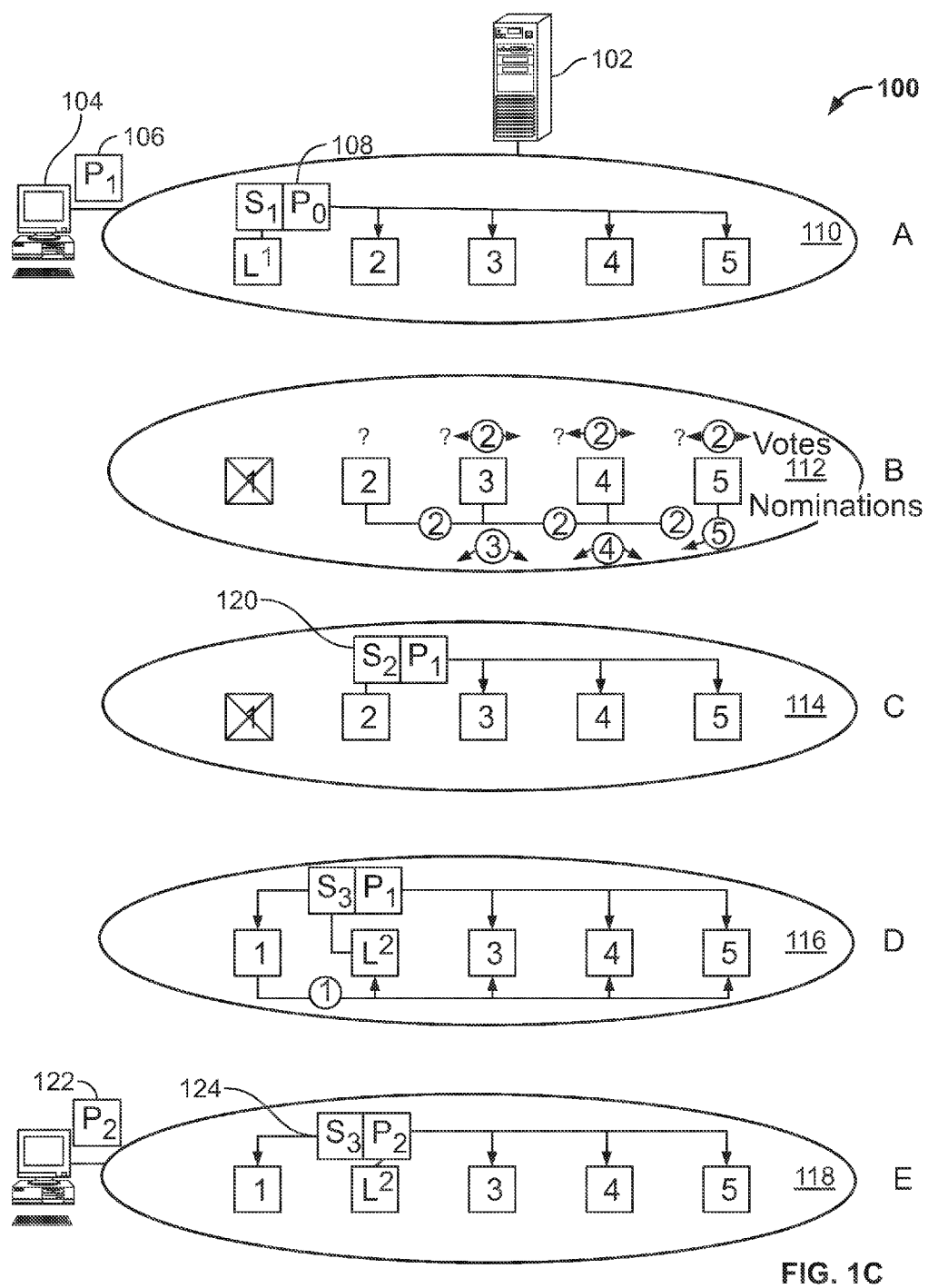

FIGS. 1A-1C are conceptual diagrams showing cooperative management of security countermeasures in a multi-server computer environment. Generally, the figures show examples of systems by which there is servers can cooperate in a peer-to-peer manner with each other to apply security policies consistently across the group of servers for implementing security countermeasures intended to interfere with the operation of malware that attempts to interact with content served by the servers.

Referring now more specifically to FIG. 1A, there is shown a system having three servers, labeled Box A, Box B, and Box C. Each of the three servers can serve content over the Internet to a client device and receive requests from that client device or other client devices. To help balance workflow and reduce the need to precisely track requests and serving of content, the system may be established so that any of the servers can handle a request that is made in response to content that was served by any of the other servers. In certain implementations, the servers are implemented as intermediary security systems that receive content from a Web server system and transcode the content in manners like those discussed below, so as to provide obfuscation for the content that interferes with the operation of malware on the clients.

Stepping through the figure then, content is initially received at Box A, and is represented here by the string ABC. Typically, a much larger and more diverse set of data may be received, but the short string is used here for purposes of clarity. Box A receives the content and transcodes it into a different string, such as by selecting a random string of characters for a function or variable name in web code that is served by the Web server system. In this instance, the string ABC has been transcoded into the string D. That string is then served along with other portions of the content to a client device, as shown by the arrow at the right side of the cloud labeled as the Internet. A user of the client device may interact with the content, such as by clicking on controls for entering data into fields of a displayed form, and may send corresponding information back to the server system such as in the form of an HTTP request. Such a request may include one or more strings that match a transcoded string that was served to the client device, and is shown here by the arrow pointing from right to left and labeled D.

In this example, Box A has gone off-line since it served the content to the client device. As a result, even if the system was arranged to have the same server handle requests and provide the content that corresponds to the requests, such implementation would not be possible because Box A cannot now handle any requests. Instead, the transcoded data in the request is routed to Box C. Box C can then pass the request back to the Web server system, but it first needs to apply a reverse transformation to the original string in order to put it in a form that the Web server system will understand. In this instance, then, Box C needs to apply the same transformation policy that Box A initially applied.

FIG. 1B shows in more detail how coordination may be required between different servers in a broader server system that is serving content and receiving corresponding requests based on the content. Again, the same three servers are shown, though into different positions to represent both servers at two different points in time—the first time (t) when content is served, and a second time (t+n) when a request is received based on the served content, such as in response to a user interacting with served content on a browser of his or her personal computer. In this example, the content transformation is again represented as a change from a first string to a second string for a small portion of the content, but instead of the initial server being disabled when the request returns, the request is simply routed to a different server for purposes of flexibility, but the system has changed from applying a first policy to applying a second policy, while the content was at the client and before the request was received. In order to reverse transcode the request, however, rules for the prior first policy and not for the current second policy, need to be applied. Therefore, the request is accompanied by metadata that indicate the policy that was applied to it, such as a policy number, or a timestamp for when the content was served, so that the second server can look up and identify the appropriate policy to use in reverse transcoding the request.

FIG. 1C shows schematically how multiple such servers can be coordinated with each other so as to update information for the servers relating to policies to be applied by the servers in this example, there are five servers, labeled 1 to 5, which receive content from a Web server 102, transcode the content, and serve the content to various client devices that have requested the content. The servers may also process requests received back from the client devices to be Web server system 102, such as to reverse changes that may have been applied by the servers when the content was first server. The operation of the servers is shown here in five different stages, labeled A to E. In the discussion here, we start at stage A and proceed linearly through the stages.

At stage A, labeled 110, the system 100 includes an administration terminal 104 by which a security administrator may control various security servers to manage and improve their operation. One role of the administration server 104 is to provide the servers with updated security policies, such as policy 106, where the policy defines actions that the servers are to take when transforming code that is served by the Web server system 102, such as to insert security countermeasures into the code and other content.

In the process performed by the servers, the coordination of the current security policy occurs in a peer-to-peer manner, and in this instance server 1 is deemed to be a leader of the other servers, in that server 1 provides the security policy definition to the other servers. Server 1 may have initially been nominated the leader by the administration terminal 104 or may have become the leader by way of the process shown in the other phases depicted in the figure.

At stage A, server 1 is shown distributing a package 108 to the other servers in the system 100. In this example, the package includes the policy received from the administration terminal 104, and labeled P1, and status information for the system 100. For example, the status information may identify how many servers are currently operating in the system 100 at the peer-to-peer level with the other servers shown here. This communication from server 1 may occur multiple times each second, such as every 100 or 200 ms.

Each of the following servers may also communicate to the lead server, such as communicating that they are still operational, and communicating other data that is relevant to the operation of the system. For example, the following servers may communicate fault information (e.g., internal hardware faults, and faults with the external environment, such as a key resource that cannot be reached by a server) and utilization information (e.g., information that indicates the level of processing load that a particular server is currently placed under) This process may continue repeatedly many times as long as the system stays stable, with each of the servers maintaining normal operation, or at least the lead server maintaining operation. If the following servers ceased to operate, the lead server may update the status information, and may also report such information to the administration terminal 104, so that an administrator may be updated on the general health of the system 100 in terms of the number of currently operational servers, and the administrator may, for example, dispatch a technician to repair or replace a server that has failed.

At stage B, labeled 112, the leader, server 1, fails. For example, a hardware component such as a storage drive may have failed on the server, rendering it inoperable. The system and each of the servers needed program to account for such failure without interruption in the service that the system provides, and also to maintain the updating of policy information. In particular, each of the following servers may be programmed to expect an update from the lead server on a regular recurring basis, such as multiple times per second. Each such following server may be programmed with a timer that begins to run each time a communication from the leader server is received. The timer may be reset by a follow-up communication from the leader server that is received before the timer expires. However, if the timer expires, the particular following server may assume that the leader server is no longer operable, and that a new lead server is needed to replace the initial lead server, server 1. As shown in the figure, each of the following servers, when its timer expires, may send out a self nomination that nominates itself to become the lead server in the place of server 1. The amount of timer for each following server and/or be delayed for the server transmits the self nomination the other servers may be varied as between the different servers in an attempt to prevent servers from nominating themselves simultaneously with each other. Therefore, the figures show a flurry of nomination being brought from each following server the other is following.

Some of the nominations may be broadcast so close in time that multiple different nominations are being transmitted simultaneously with each other. As a result, self-nominations may arrive out of order when comparing one of the servers with another of the servers as a result of the distance between the respective servers. The system 100 and following servers may be programmed to account for this problem by having each server "vote" for the first server whose nomination it receives, and returning that vote to the particular self-nominating server, and not doing so for subsequently-received nominations. If no server gets a majority of votes (as determined by the number of servers indicated as being active in the most recent communication form the leader server), each server may wait a specified period and send another nomination. The delay before issuing a follow-up nomination may differ for each of the servers (e.g., may be a randomly-selected delay time) so as to minimize the chance that the second round of nominations is also indeterminate. The nominating and serving may then continue until one of the following servers has a majority of the votes and, announces to the other servers that it is now the leader, and begins periodically sending coordinating information to the following servers as the new leader. Note that the servers will know how many votes is a majority by having previously sent that information by the leader, and then reducing the number of operating servers by one as a result of the lead server no longer being in the system.

At phase C, server 2 has determined that it received a majority of the votes, and correspondingly, the other servers have determined that they did not receive a majority of the votes. As a result, server 2 becomes the new leader and is shown transmitting to the other servers package 120, which is updated as compared to package 108. In particular, although package 120 has the same security policy 108, it has an updated status, because the new status needs to indicate that there is one less server in the pool. The process for phase C then repeats continuously in a manner similar to the process that was previously repeated at phase A, with server 2 periodically sending information to the other servers to coordinate their operation—including by updating status of the various servers (e.g., by reducing the number of servers in the system if one of the followers stops responding to communications) and updating security policy information.

At phase D, server 1 comes back online. It reports to the other servers its availability, and server 2 receives the report as the leader that is operating with the system 100. Server 2 may then update the status information again and send out the updated package periodically with the updated status. Despite server 1 being the original lead server in this example, it does not take over as the lead server just because it has become active again. Rather, because the system is peer-to-peer and server 2 is already in place as the lead server, server 2 stays the leader server until there is a reason for it to be replaced, such as server 2 failing.

At phase E, labeled 118, server 2 is still the leader and is broadcasting a package 124 that has the updated data in it. In this example, administration terminal 104 has also updated the security policy with a new policy 122 which server 2 has inserted into the package 124. In this manner, each of the servers may operate as a machine that is constantly looking for updated policy information and constantly being updated by a leader, and where the servers may self-repair a failure in the leadership structure. Of course, parallel with the administrative action depicted here, each of the servers may also be processing content served by web server system 102, while the control actions for coordinating the servers is also occurring. That content may then be served to various client devices that receive the content, while using updated security policies to do so, and receiving requests from the client devices, and processing those requests with the updated security policies also.

In certain implementations, the package 124 may include more than just the current security policy, or the servers may save information about prior security policies. Such a package of information may be useful when a request received back from a client device process a prior security policy that is no longer a policy being applied by the servers. Saving information about a prior policy can enable a server to process such a "stale" request.

In this manner then, the system 100 may implement and distribute security policy information that can be used to implement countermeasures to be applied against malware that is served content by the system 100. Such coordination may occur without substantial overhead, and by security servers themselves as long as they are programmed with rules so that leadership is not claimed or taken by multiple servers simultaneously. Such cooperative peer-to-peer operation may thus provide an efficient way to implement changing security policies in a system 100.

Figure 2:
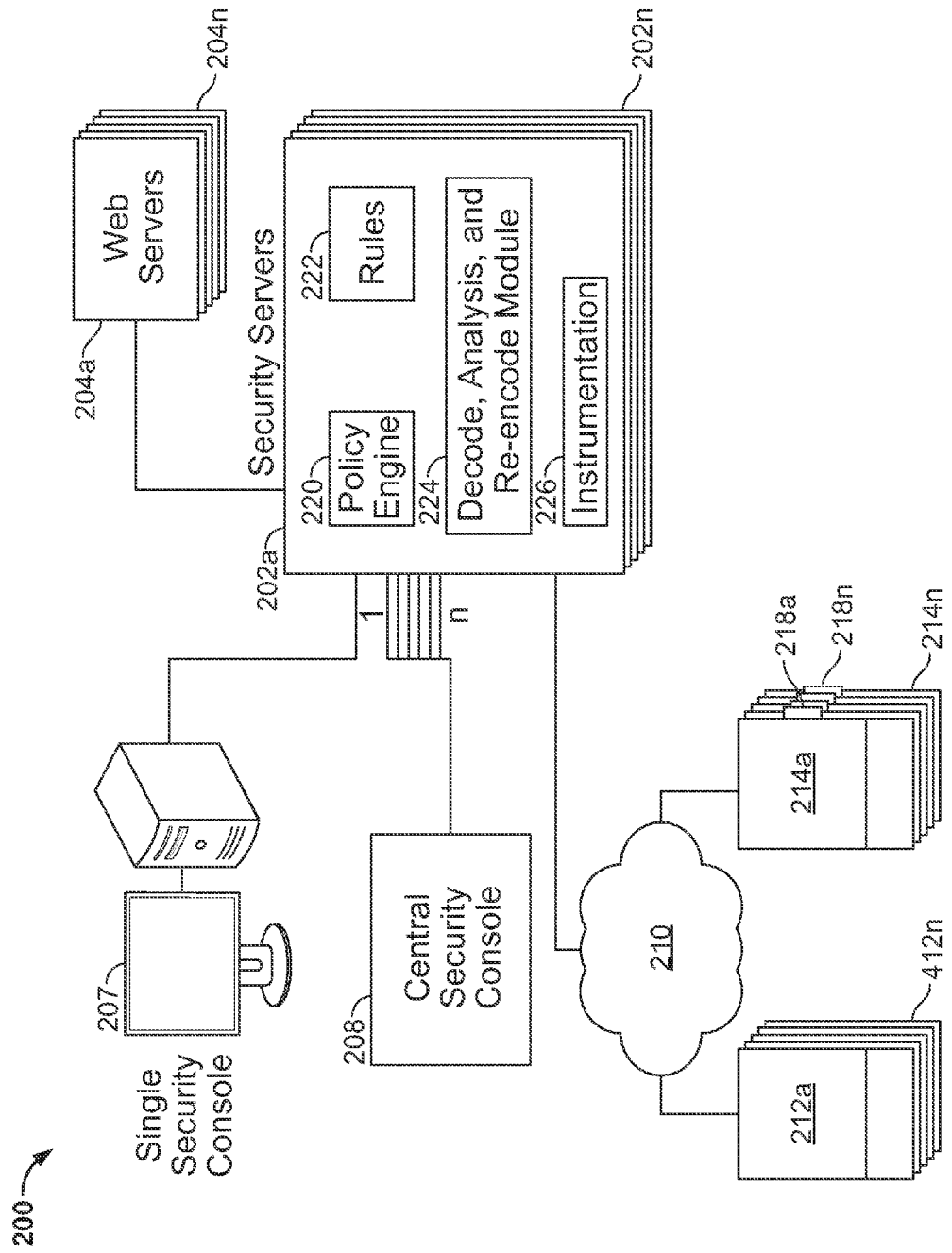
FIG. 2 shows a system for serving polymorphic and instrumented code.

FIG. 2 shows a system 200 for serving polymorphic and instrumented code. Generally, polymorphic code is code that is changed in different manners for different servings (e.g., different for every serving or different for some servings but the same for others) of the code in manners that do not affect the manner in which the executed code is perceived by users, so as to create a moving target for malware that tries to determine how the code operates, but without changing the user experience. Instrumented code is code that is served, e.g., to a browser, with the main functional code and monitors how the functional code operates on a client device, and how other code may interact with the functional code and other activities on the client device.

The system 200 may be adapted to perform deflection and detection of malicious activity with respect to a web server system. Deflection may occur, for example, by the serving of polymorphic code, which interferes with the ability of malware to interact effectively with the code that is served. Detection may occur, for example, by adding instrumentation code (including injected code for a security service provider) that monitors activity of client devices that are served web code.

The system 200 in this example is a system that is operated by or for a large number of different businesses that serve web pages and other content over the Internet, such as banks and retailers that have on-line presences (e.g., on-line stores, or on-line account management tools). The main server systems operated by those organizations or their agents are designated as web servers 204a-204n, and could include a broad array of web servers, content servers, database servers, financial servers, load balancers, and other necessary components (either as physical or virtual servers).

In this example, security server systems 202a to 202n (which may implement components those in the figure above) may cause code from the web server system to be supplemented and altered. In one example of the supplementation, code may be provided, either by the web server system itself as part of the originally-served code, or by another mechanism after the code is initially served, such as by the security server systems 202a to 202n, where the supplementing code causes client devices to which the code is served to transmit data that characterizes the client devices and the use of the client devices in manners like those discussed in the many examples above. As also described below, other actions may be taken by the supplementing code, such as the code reporting actual malware activity or other anomalous activity at the client devices that can then be analyzed to determine whether the activity is malware activity.

The set of security server systems 202a to 202n is shown connected between the web servers 204a to 204n and a network 210 such as the Internet. Although both extend to n in number, the actual number of sub-systems could vary. For example, certain of the customers could install two separate security server systems to serve all of their web server systems (which could be one or more), such as for redundancy purposes. The particular security server systems 202a-202n may be matched to particular ones of the web server systems 204a-204n, or they may be at separate sites, and all of the web servers for various different customers may be provided with services by a single common set of security servers 202a-202n (e.g., when all of the server systems are at a single co-location facility so that bandwidth issues are minimized).

Each of the security server systems 202a-202n may be arranged and programmed to carry out operations like those discussed above and below and other operations. For example, a policy engine 220 in each such security server system may evaluate HTTP requests from client computers (e.g., desktop, laptop, tablet, and smartphone computers) based on header and network information, and can set and store session information related to a relevant policy. The policy engine 220 may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their inter operation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 202a-202n, such as by the security servers 202a-202n implementing a web crawler (not shown) to recursively search for new and changed content and to report such occurrences to the security servers 202a-202n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 222 may store analytical rules for performing such analysis and for re-encoding of the content. The rules engine 222 may be populated with rules developed through operator observation of particular content types, such as by operators of a system studying typical web pages that call JavaScript content and recognizing that a particular method is frequently used in a particular manner. Such observation may result in the rules engine 222 being programmed to identify the method and calls to the method so that they can all be grouped and re-encoded in a consistent and coordinated manner.

The decode, analysis, and re-encode module 224 encodes content being passed to client computers from a web server according to relevant policies and rules. The module 224 also reverse encodes requests from the client computers to the relevant web server or servers. For example, a web page may be served with a particular parameter, and may refer to JavaScript that references that same parameter. The decode, analysis, and re-encode module 224 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 202 along with an identifier for the particular client computer so that the system 202 may know which key or function to apply, and may otherwise maintain a state for the client computer and its session. A stateless approach may also be employed, whereby the system 202 encrypts the state and stores it in a cookie that is saved at the relevant client computer, or in a hidden field such as a field on a form that is being presented to a user and for which the input to the form is being obfuscated in a polymorphic manner. The client computer may then pass that cookie data back when it passes the information that needs to be decoded back to its original status. With the cookie data, the system 202 may use a private key to decrypt the state information and use that state information in real-time to decode the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

The decode, analysis, and re-encode module 204 and the security server system 202 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 224 may be adapted to apply different modifications to each instance of a common web resource, or common portion of multiple web resources, such that the web code that it is ultimately delivered to the client computers in response to each request for the common web resource includes different modifications.

In certain implementations, the analysis can happen a single time for a plurality of servings of the code in different recoded instances. For example, the analysis may identify a particular function name and all of the locations it occurs throughout the relevant code, and may create a map to each such occurrence in the code. Subsequently, when the web content is called to be served, the map can be consulted and random strings may be inserted in a coordinated matter across the code, though the generation of a new name each time for the function name and the replacement of that name into the code, will require much less computing cost than would full re-analysis of the content. Also, when a page is to be served, it can be analyzed to determine which portions, if any, have changed since the last analysis, and subsequent analysis may be performed only on the portions of the code that have changed.

Even where different modifications are applied in responding to multiple requests for a common web resource, the security server system 202 can apply the modifications in a manner that does not substantially affect a way that the user interacts with the resource, regardless of the different transformations applied. For example, when two different client computers request a common web page, the security server system 202 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

The decode, analysis, and re-encode module 224 for each of security server systems 202a-202n may be updated with policies from policy engine 220 and rules for rule engine 222 so as to operate in a coordinated manner with each other—at least for security server systems 202a-202n that are operating in combination with a particular customer of a security service. Such coordination may occur by one of the security server systems 202a-202n being named a leader and acting as a leader that periodically distributes policy and status information to the other server systems, and elections occurring in a peer-to-peer manner like that described above when a leader fails or otherwise cannot carry on as a leader.

An instrumentation module 226 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other metadata that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 204a-704n, as encoded by decode, analysis, and re-encode module 224, may be rendered on web browsers of various client computers. Uninfected client computers 212a-212n represent computers that do not have malicious code programmed to interfere with a particular site a user visits or to otherwise perform malicious activity. Infected client computers 214a-214n represent computers that do have malware or malicious code (218a-218n, respectively) programmed to interfere with a particular site a user visits or to otherwise perform malicious activity. In certain implementations, the client computers 212a-212n, 214a-214n may also store the encrypted cookies discussed above and pass such cookies back through the network 210. The client computers 212a-212n, 214a-214n will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 212a-212n, 214a-214n. For small-scale analysis, each web site operator may be provided with a single security console 207 that provides analytical tools for a single site or group of sites. For example, the console 207 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations-an indication that stale malicious code may be trying to access such elements surreptitiously.

Console 207 may also be multiple different consoles used by different employees of an operator of the system 200, and may be used for pre-analysis of web content before it is served, as part of determining how best to apply polymorphic transformations to the web code. For example, in combined manual and automatic analysis like that described above, an operator at console 207 may form or apply rules 222 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 208 may connect to a large number of web content providers, and may be run, for example, by an organization that provides the software for operating the security server systems 202a-202n. Such console 208 may access complex analytical and data analysis tools, such as tools that identify clustering of abnormal activities across thousands of client computers and sessions, so that an operator of the console 208 can focus on those clusters in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 208 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 200, may be blocked from interaction, or may have their operators notified that their computer is potentially running malicious software (e.g., by sending an e-mail to an account holder of a computer so that the malicious software cannot intercept it easily).

Figure 3A:
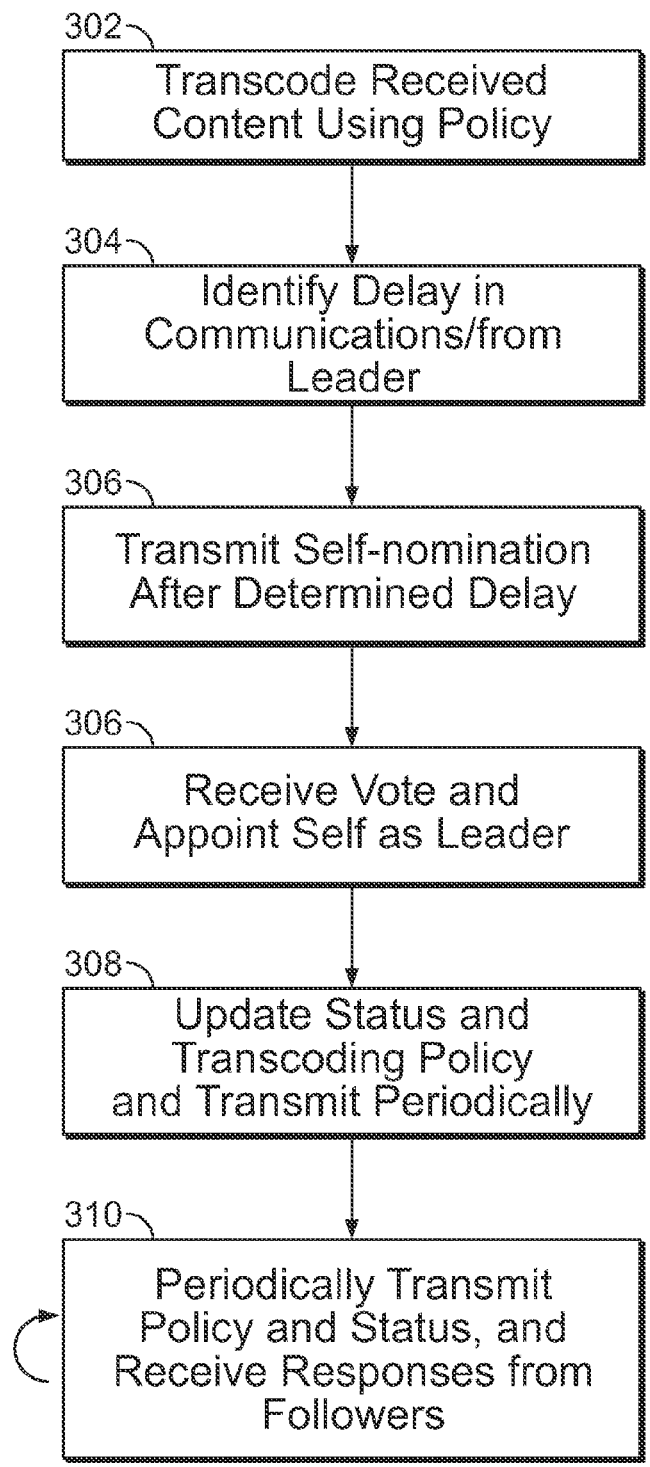
FIGS. 3A-3C are flow charts of processes for serving transcoded content in a multi-server security system.
Figure 3B:
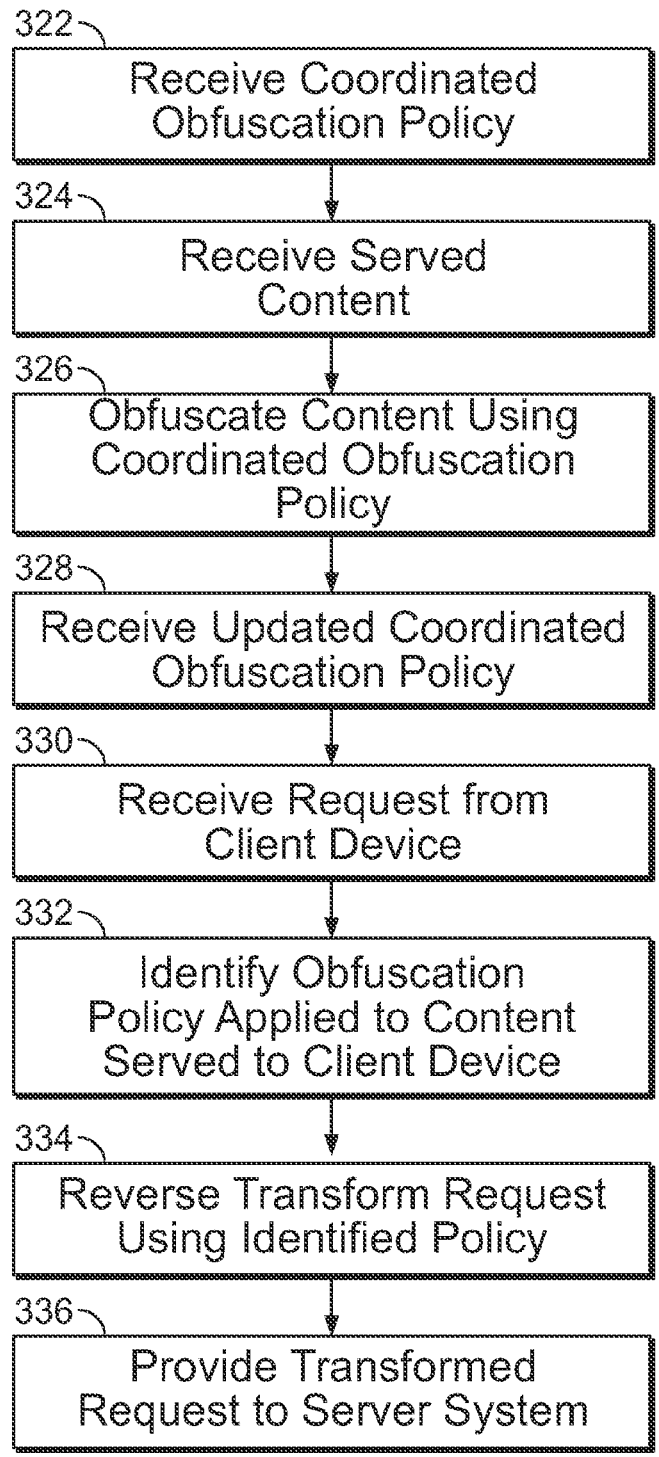
Figure 3C:
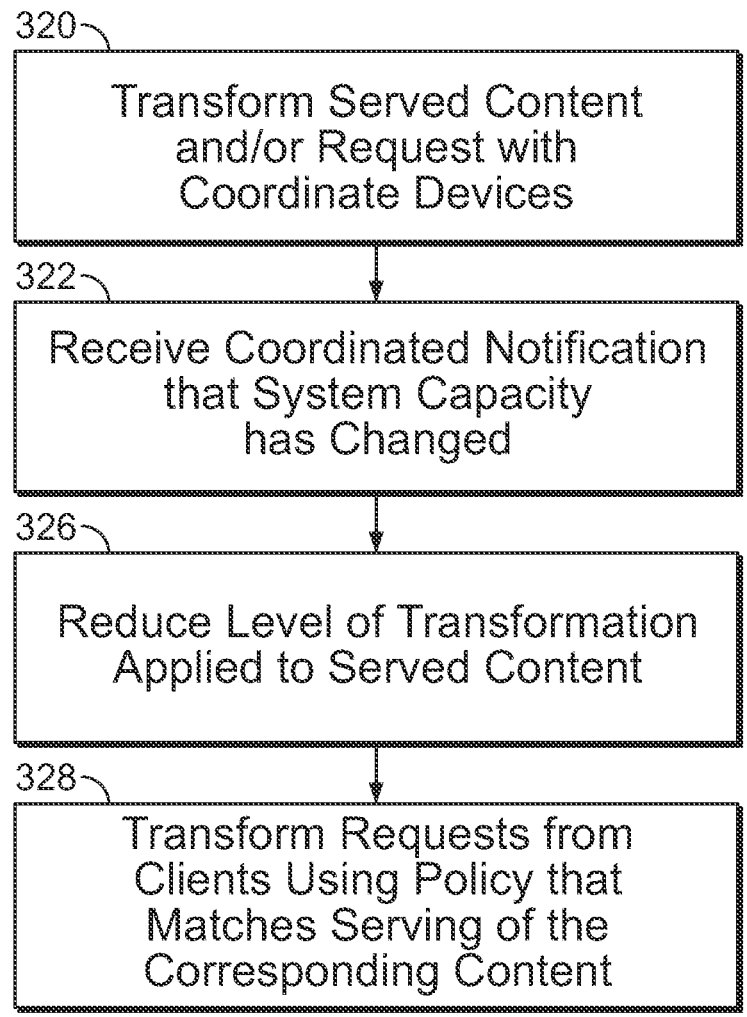

FIGS. 3A-3C are flow charts of processes for serving transcoded content in a multi-server security system. In general, the processes identify manners in which multiple servers or server subsystems may coordinate their operation without a need for unnecessary overhead in the cooperation. In particular, such servers may be controlled by a current security policy, and may cooperate with each other to share updates in the policy so as to ensure that all parts of the system are operating consistently with each other, using the latest security policy.

Referring now particularly to FIG. 3A, the process begins at box 302, where received content is transcoded using a security policy. Such transcoding may occur at one or more intermediary security servers that receive content from a web server system, transcode and supplement the content for security purposes, and serve secured content to client devices. The transcoding may occur in various manners, including by a system such as that described with respect to FIG. 2 above.

At box 304, a server in the system (a receiving server or following server) identifies a delay in communications from a lead server. The receiving server may be programmed to institute a timer between communications from the lead server (e.g., upon receiving each communication from the lead server), and may be programmed to assume that the lead server has failed if the timer expires without a subsequent communication being received from the lead server. Each time a timely communication is received from the lead server, the timer may be reset.

Box 306 shows what may occur when no timely notification from the lead server is received. In such an instance, the timer may expire, and the following server may transmit a nomination for itself to become the lead server, after a determined delay time. The delay time may be set to vary as between different ones of the servers in a system, so as to prevent unnecessary collisions between subsequent communications that the servers put on the network that connects the servers.

At box 307, the following server may receive one or more votes from other ones of the servers in the system in response to providing the nomination to them. The following server may also receive nominations from those other servers and may vote for the first such other following receiver from which it receives a self-nomination. In this example, each server is programmed to cast a single vote for the other server that it first receives a self-nomination from. All of this nomination and voting activity may, therefore, occur essentially simultaneously as between all of the servers in the system. Each of the servers may also be programmed to make itself the new leader only if it receives a certain portion of the vote, such as a majority of the votes from the servers known to still be in operation in the system. As a result, only one of the servers can be the next lead server, because only one can collect a majority of votes from the other followers.

At box 308, the server indicated by this process has appointed itself as the lead server. It then accesses policy and status information that it had previously been given by the prior lead server. It may update such information, such as by reducing by one the number of servers known to be in the system (because the old lead server has dropped out). It may then begin transmitting the status information and policy information to the other servers as if it were the lead server, and may receive back communication from the other (following) servers, such as heartbeats or responses indicating that they also are still in operation (box 310). If any of the heartbeats or responses fails to arrive from the following servers, the new lead server may assume that it has lost a following server, and may update the status information to indicate such loss.

During this time, the lead server may also be responsible for receiving content, such as from a Web server system, and using the security policy to transcode the content before serving it to requesting clients. In addition, the lead server may be passed with reverse transcoding requests from such clients in the pool.

The various servers may also identify changes in the status information and change the manner in which they transcode data accordingly. For example, the number of remaining servers or other information may indicate a load level on the remaining servers in the system, and may be distributed by the lead server. Each of the servers, in transcoding data, may use such system load data to change the level of effort they place in processing data. For example, where a system has a relatively large number of server systems operating to transcode content flow from a server system to clients (and returning requests from the clients to the content server system), the various security server system may implement a plurality of different, and complex, security countermeasures on the content. Where the load on the security server system increases, such as by a larger number of requests per unit time arriving from clients or by security servers failing, such increased load may be reflected in data distributed to the following servers from the lead server, and may be used by each of the servers to reduce the number of security countermeasures they apply, so that they can handle more requests per unit time. In certain implementations, if an increase in load is sudden, a system may stop transcoding all outgoing content for a time period, so that accommodation may be made for all follow-up requests received from clients that may need reverse transcoding (because the system will not break simply from temporarily reducing or stopping transcoding, but request might be blocked if they are not reverse transcoded).

Also, during this time, the policy and/or status information may change, and the lead server may update its records accordingly and also send such updates to the following servers, so that they can implement the new policies, and can also store the updated status information. Such updates may be necessary when a vote occurs, so that the remaining following servers know the number of voting servers in a group, and thus know what a majority vote is, in order to determine if they should name themselves a next lead server.

Referring now to FIG. 3B, another process is shown that is similar to the process of FIG. 3A. In this example, however, the process focuses more on the operations performed in serving content according to coordinated policies than on the operations for updating those policies.

The process begins at box 322, where a coordinated security countermeasure application policy is received by a server device. The policy may define, for example, a map or template for particular content that the server device is to transcode for a web server system. The policy may be developed using analysis like that described above for the system 200 of FIG. 2. Such analysis may involve identifying features in the content that can be changed in various manners without affecting the manner in which the content presents itself to a user at a client, and establishing a template or map that can be used to transcode such parts of the content into different forms consistently throughout the content (e.g., changing a particular variable name or function name every time it appears in HTML, CSS, and JavaScript).

At box 324, content served from the web server system is received. The content can take a variety of forms, such as HTML, CSS, and JavaScript code. Such different forms may produce a web page when rendered on a client device, and connections may be made between the different types of content (e.g., an element in HTML code may call JavaScript code).

At box 326, the device obfuscates the content using the received coordinated obfuscation policy. For example, the policy may include a template that identifies locations in the content for strings that should be changed in the transcoding, along with instructions for the changes, such as a particular change involving selecting a random string to substitute for a string in the code, and to place that same random string everywhere that the string in the code exists (so that cross-references in the code do not break), though each serving of the code can use a different random string for the substitution so as to create a form of moving target for malware.

At box 328, updated policy information for performing the obfuscations is received. For example, perhaps the content being received from the web server system has changed in a material way, analysis has been performed on the new version of the content, and a new template has been generated for transcoding has been generated from the analysis. Or perhaps the content has not changed, but a new analysis has been performed. Or perhaps the system has determined to change from applying a single countermeasure, to applying a different countermeasure or an additional countermeasure, in response to determining, from data received from software executing on the client devices and monitoring the client devices, that the initial countermeasure does not have effectiveness or has lost effectiveness.

At box 330, the server receives a request from a client device that has been served code. In this example, the request is "stale" in that it originates from code served to the client device when a prior policy was in place. To deal with the possibility of stale requests, the device here is programmed (box 332) to identify the policy that was applied to the content that was served to the client device. The device then (box 334) processes the request using data that reflects the old stale policy, such as by using a key from an old policy to reverse transcode the request.

At box 336, the device provides the transformed request to the Web server system. Because the request has been reverse transcoded from content that was initially transcoded, the request will look to the Web server system as if it is a request in response to the original content that the Web server system transmitted (which, technically, it is). In this manner, the process allows the various servers in a bank or pool of servers to operate together and share their workload even as security policies are changed for the pool.

FIG. 3C shows a process by which a system may adapt to a loss of one or more servers by reducing the level of processing that it performs on content to be served, so that the reduced-capacity system can still keep up with demand. Such capacity decisions may be made by using information received from a server coordination process like those discussed above and below.

The process in this example begins at box 340, where a server in a system is operating normally as a security intermediary that receives content from a web server, applies one or more security countermeasures to it, and serves the content to requesting clients. The intermediary may perform similar operations (though in reverse) to requests received from clients. The operations the device is performing correspond to those performed by other devices in a larger system, and the particular manner in which they apply the security countermeasures is consistent across the system because of coordination performed by the devices.

At box 342, the process receives coordinated notification that the system capacity has changed. Such notification may occur by a lead server in a peer-to-peer group of servers periodically sending to the other servers information about the number of servers still active in the group (based on whether it has received responses from those servers in a defined preceding time period), and changing that number when the lead server determines that one of the other servers has stopped operating in the group. Such communication of each change in system capacity may occur as part of a communication that the lead server makes repeatedly, and that the following servers use to get information and to know that the lead server is still operational and that they should stay in their status as followers.

At box 346, a particular following server reduces a level of transformations that it applies to serve content. For example, the following server may store data that indicates a load level that is required to perform each of multiple corresponding security countermeasures that it may apply to content that it serves. When it receives updated information about a change in capacity to the overall system and/or about some other change in for the overall system, it may consult such information to determine which security countermeasures to continue applying so that it can meet its expected load for the near future (e.g., where the load may be expected to increase if the overall system capacity has fallen recently). For example, if the load on a five-server system is staying constant, and one of the servers fails, the other four servers will have to pick up the slack of the lost server—they will each have to increase their capacity by 25%. If a particular following server is currently applying three countermeasures—one that uses up 50 percent of it processing capacity, another that uses up 20 percent, and a third that uses up 30 percent, the server may be programmed to stop performing the third countermeasure so as to free up that 30 percent of capacity so that it will be able to take on the extra 25 percent needed to cover for the failed server.

Alternatively, the server may simply stop applying any transformations to 25 percent of the requests that it services, but continue applying all transformations to the remainder. Alternatively, the server's load may be a combination of transforming served content and transforming requests that have been made back to the origin content servers. To ensure that the system keeps operating without breaking, the server needs to reverse transform the requests but does not necessarily have to transform other served content. So the system may seriously reduce the amount of transformation it performs on the served content (because that content will still work, though with lower levels of security—which lower levels may be minimal if content is only served unprotected for a short time period). The server may focus its processing instead on requests, which may be received in a transformed manner because they are made from pages that were served after being subjected to transformation. The server may also be programmed to know which groups of countermeasures work well together and which do not, and can match a load level that it is expected, by the greater system, to achieve, with load levels that have previously been assigned to various packages of countermeasures. For example, the lead server may communicate to a follower that it is expected to make available 100 load units of processing in the coming time period (e.g., a sub-second time period), and the server may consult stored information about the level of load required to implement each of a variety of packages of security countermeasures, and select the "best" package that falls below the assigned load limit for the current situation.

At box 348, the process operates with the following server transforming requests from clients using a policy that matches serving of the corresponding content. For example, the load increase caused by losing the other server may have been so severe that the following server (which may have become the lead server in the meantime by the processes discussed above) stops adding countermeasures to outgoing content altogether, and focuses all its processing resources on requests coming back from clients that have previously been served content with countermeasures.

Figure 4A:
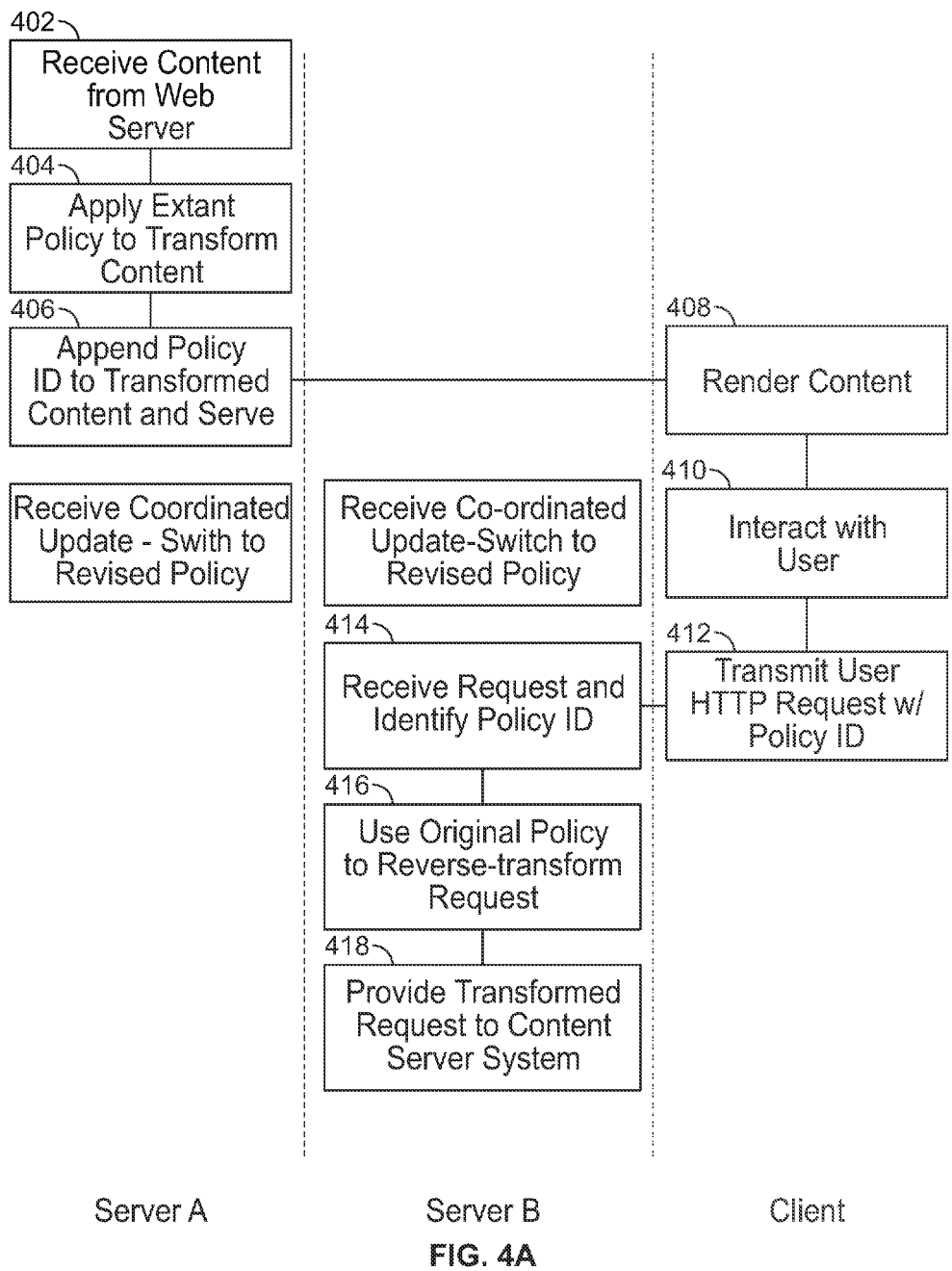
FIGS. 4A and 4B are swim lane diagrams of processes for coordinating the operation of multiple servers adding security countermeasures to served content.
Figure 4B:
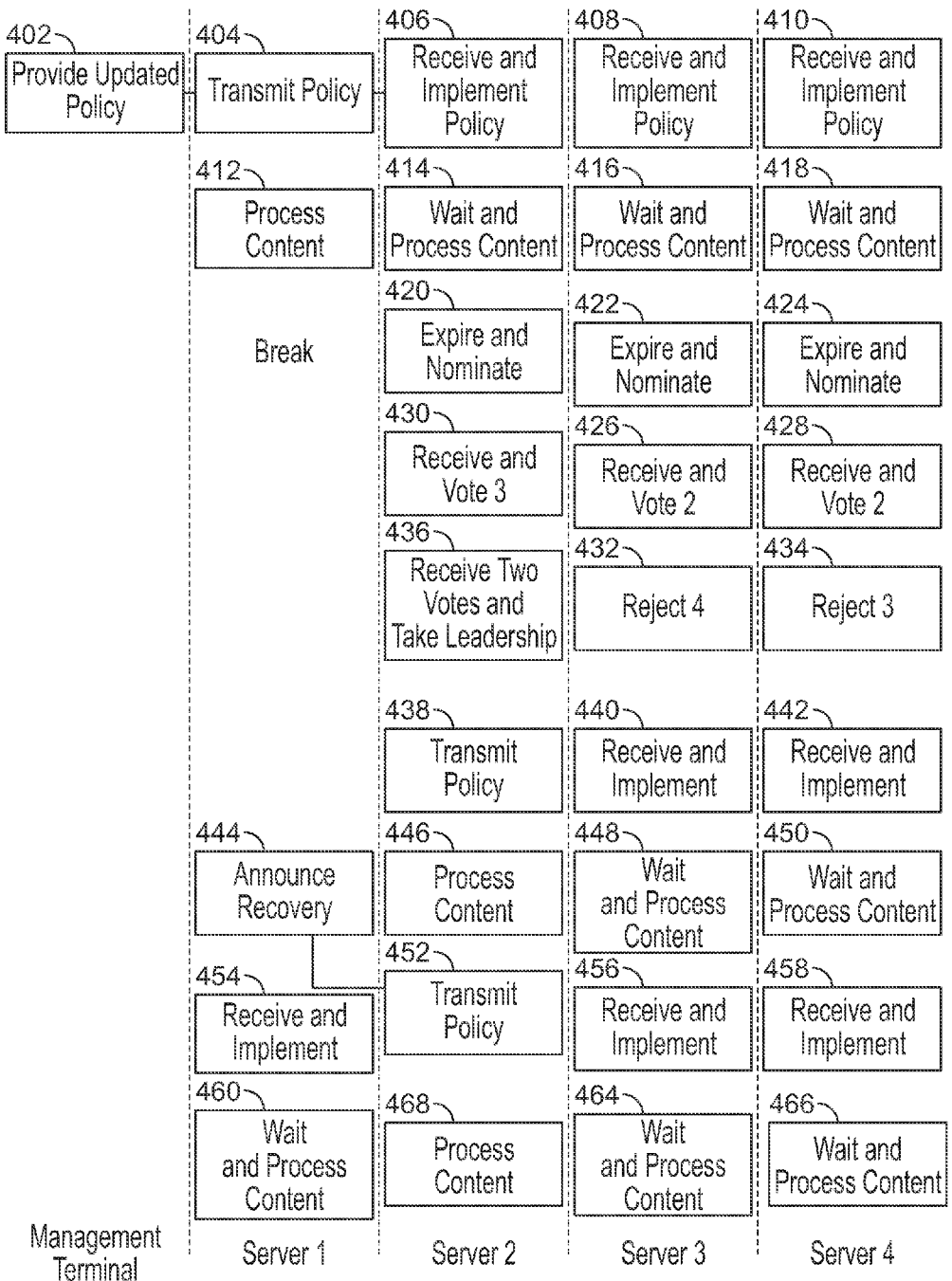

FIGS. 4A and 4B are swim lane diagrams of processes for coordinating the operation of multiple servers adding security countermeasures to served content. Referring specifically to FIG. 4A, the depicted process generally shows processing of served content by a first server and processing of a corresponding request from a client.

The process begins at box 402, where a first server receives content from an origin web server. The content may include, for example, HTML, CSS, and JavaScript code, and may be obtained as a single transmission or in multiple transmissions (and the server may obtain some of the code by identifying a pointer in the initial code, such as gathering JavaScript code based on tags in HTML code).

At box 404, the server applies an extant security policy to the content in order to transform it into transformed content. Various different security countermeasures may be applied individually or in combination in this step. At box 406, a policy identifier is appended to the transformed content and served to a client (and may be encrypted by a technique by which the servers hold the private key). The identifier may be useful in a system that changes the transformations it applies to served content over time so as to always have a package of policies in effect that are determined to be currently useful, which may also interfere with the ability of malware to determine how the process operates and to exploit the policies being applied by the process.

The client receives the content and renders it at box 408, such as through a web browser or other application. The client may also store the identifier in a cookie or other location. At box 410, the served code interacts with the user, where the interaction is preferably indistinguishable to the user from what it would have been without any application of security countermeasures to the content. At some point, the user makes some action or selection to request additional content, such as by a user typing in security credentials and pressing a "select" button, as shown in box 412. The client may then encode the request in an HTTP request, and may also grab the identifier from the cookie and send it.

Such action by the client may cause an HTTP request to be transmitted back to the web server system (and thereby to the security server system, which may operate as a CDN). In the meantime, both the original server (Server A) and another server (Server B) may have received a communication from a lead server telling them to change the security policy they apply to their processing of content (boxes 409). They may thus have been serving content using such new policy while the user at the client was interacting with the rendered content it received at box 408.

To make the security system more efficient, it may include routers or load balancers that route requests to different servers than those that served the content that corresponds to the requests. Thus here, Server B receives the client request at box 414, and extracts the data from the request, including the security policy identifier (which may be a unique numeric identifier, a time stamp of the time the content was served and which can be used to identify the extant security policy at that time, or another representation). Server B then uses the policy identifier to determine the parameters of the security policy that was used to transform the originally-served content. For example, when the policy was previously rolled out to the various servers, they may have been provided with the identifier and a list of the countermeasures to employ as part of the policy. In this instance, Server B can look that up and apply counteracting versions of the countermeasures to reverse-transform the request (box 416) and then provide the transformed request to the origin content server system (box 418).

In this manner then, the process here can apply security countermeasures at a first server and under a first policy, and can process the follow-up corresponding request from a client that is served the content, even with a different server that is operating with a different policy when it gets the request. Such coordination may occur in real-time with the peer-to-peer techniques discussed above, and without having to coordinate the relevant state of the security policy on the server side, by instead sending information for that state to the client side.

Referring now to FIG. 4B, there is shown a process of multiple servers coordinating their activity through changes in security policies and failures of servers, in a peer-to-peer coordinated manner. The process starts at box 402, where a management terminal provides an updated security policy to Server 1, which is the lead server at this time. The management terminal may be operated by personnel or a security management system that analyzes how various types of content being served are faring with respect to malware, and that uses such feedback (e.g., from injection code monitoring the operation of malware on client devices trying to interact with content served with the injected code). The lead server receives the policy and then shares it with the other servers (box 404), perhaps after adding additional information (e.g., information indicating a number of servers (4) currently operating in the system), and those servers implement the policy for code that they subsequently server (boxes 406, 408, and 410). For a time (e.g., a millisecond or several milliseconds), no other peer-to-peer communications occur, with the lead server processing content it receives (box 412) and the other servers processing content they receive and waiting for another communication from the lead server (boxes 414, 416, and 418).

Before the lead server can send another communication, it fails. The other servers may be waiting on timers they started when they received the initial communication from the lead server, and those timers may expire independently. The expiration of the timer makes the other servers determine that the lead server is no longer operational, from whom regular communications were expected, and the other servers may each be programmed to transmit a nomination for themselves to become the lead server, to each other the other servers (boxes 420, 422, and 424). Each of those servers may then vote for the server that they first receive a nomination from, with Server 2 voting for Server 3, and Servers 3 and 4 both voting for Server 2 (boxes 426, 428, and 430). The servers reject any subsequently-received nominations, either by ignoring them or by responding with a "no" vote (boxes 432 and 434).

Based on the data previously received from Server 1, each of the servers can determine that there are now three servers in the system, and may be programmed to take the lead if they receive a majority of the votes. In this example, Server 2 receives two votes, which is a majority, so it takes over the lead role (box 436). The other servers receive zero or one vote, and those being less than a majority, those servers do not make themselves leads.

With Server 2 taking the role of lead, it then begins sending to the other side information of the type that Server 1 was previously sending (box 438) and processes content (box 446), and those other servers implement the policy, process content with it, and run timers while waiting for subsequent communications (boxes 440, 442, 448, and 450). Each server may also modify what it does in response to receiving information from Server 2 indicating that there are now three servers rather than four (see process of FIG. 3C).

At box 444, Server 1 recovers, and may be programmed to announce its new status to all of the other servers so that it can be added back into the cohort quickly. Server 2, as the lead server, then adds Server 1 as a following server, and starts transmitting the policy and other data to it on a recurring basis along with transmissions that would already have occurred to the other servers (box 452). Such data may also be indicated to indicate the status of the system as having four servers now rather than three. Each of the servers may then re-adjust their processing to reflect the greater capacity of the system with Server 1 back on-line (e.g., each server may perform more intensive processing than it was because it does not need to carry as much of the overall system load). Thus, Servers 1, 3, and 4 continue to process content as followers (boxes 454, 456, and 458). Though not shown, the management terminal may send additional policy updates in the interim, and Server 2 may now be the server that accepts and implements such changes to the other servers. But the process is generally continuous, so that the steps here may be repeated and occur in various combination and orders, with the lead server processing content and sending periodic communications (box 462) and the remaining servers (the following servers) running timers and processing content using the latest policies they have received (boxes 460, 464, and 466).

FIG. 5 shows an example of a computer system 500. The system 500 can be used for the operations described in association with any of the computer-implement methods described previously, according to one implementation. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middle-ware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    receiving, at a first server sub-system, content to be served to a client computing device;
    transcoding, by the first server sub-system, the content using a first security policy received from a second server sub-system;
    determining, by the first server sub-system, that the second server sub-system has likely ceased communicating security policy information;
    submitting, by the first server sub-system, a self-nomination to one or more server sub-systems;
    determining, by the first server sub-system, that a majority of a plurality of server sub-systems that includes the one or more server sub-systems has voted in favor of the self-nomination; and
    in response to determining that the majority of the plurality of server sub-systems voted in favor of the self-nomination, transmitting, by the first sub-system, a second security policy to the one or more server sub-systems.

2. The computer-implemented method of claim 1, wherein after the first server sub-system transmits the second security policy, the one or more server sub-systems transcode content requested by one or more client computing devices using the second security policy.

3. The computer-implement method of claim 1, wherein transcoding the content by the first server sub-system comprises selecting one or more security countermeasures to apply to the content using the first security policy.

4. The computer-implemented method of claim 1, wherein determining that the majority of the plurality of server sub-systems has voted in favor of the self-nomination by the first server sub-system is based on a number of operating server sub-systems in the plurality of server sub-systems.

5. The computer-implemented method of claim 1, further comprising after transcoding the content, the first server sub-system transmitting, to the client computing device, an identifier of the first security policy and the content.

6. The computer-implemented method of claim 1, further comprising:
    receiving, by the first server sub-system, an indication that the second server sub-system has recovered from an operational failure;
    transmitting, by the first server sub-system, the second security policy to the second server sub-system, wherein after the first server sub-system transmits the second security policy to the second server sub-system, the second server sub-system transcodes content requested by one or more client computing devices using the second security policy.

7. The computer-implemented method of claim 1, further comprising in response to receiving an indication that one or more other server sub-systems have likely failed, adjusting, by the first server sub-system, a manner in which content to be served is transformed using the first security policy.

8. The computer-implemented method of claim 1, wherein submitting the self-nomination by the first server sub-system is performed after a delay associated with the first server sub-system that is different than a delay associated with at least one server sub-system of the plurality of server sub-systems.

9. A computer-implemented method, comprising:
   receiving, at a first server sub-system, content to be served to a client computing device;
   transcoding, by the first server sub-system, the content using a first security policy received from a second server sub-system;
   determining, by the first server sub-system, that the second server sub-system has likely ceased communicating security policy information;
   receiving, by the first server sub-system, at least one request to vote on a leader server sub-system from one or more server sub-systems;
   receiving, by the first server sub-system, a second security policy from a third server sub-system selected from the one or more server sub-systems; and
   after receiving the second security policy, transcoding, by the first server sub-system, second content using the second security policy.

10. The computer implemented method of claim 9, wherein transcoding the content by the first server sub-system comprises selecting one or more security countermeasures to apply to the content using the first security policy.

11. The computer-implemented method of claim 9, wherein a majority of a plurality of operating server sub-systems comprising the first server sub-system and the one or more server sub-systems has voted in favor of the third server sub-system.

12. The computer-implemented method of claim 9, further comprising after transcoding the content, the first server sub-system transmitting, to the client computing device, an identifier of the first security policy and the content.

13. The computer-implemented method of claim 9, further comprising in response to receiving an indication that one or more other server sub-systems have likely failed, adjusting, by the first server sub-system, a manner in which content to be served is transformed using the first security policy.

14. A system comprising:
   a plurality of security servers, each security server of the plurality of security servers having one or more processors and tangible storage that stores instructions which, when executed by the one or more processors, cause each security server to perform:
   processing content requested by one or more client computing devices using a current security policy, wherein the current security policy is the most recently received security policy;
   determining that a leader security server has likely ceased communicating security policy information;
   after determining that the leader security server has likely ceased communicating security policy information, transmitting, to one or more security servers of the plurality of security servers, a self-nomination to become the leader security server;
   when the self-nomination to become the leader security server is successful, transmitting a security policy to the one or more security servers;
   responding to nominations from other security servers of the plurality of security servers by voting for the nomination that is first received.

15. The system of claim 14, wherein processing the content comprises selecting one or more security countermeasures to apply to content using the current security policy.

16. The system of claim 14, wherein each security server is programmed to determine that the self-nomination to become the leader security server is successful when the self-nomination is voted for by a majority of operating security servers in the system.

17. The method of claim 14, wherein the instructions, when executed by the one or more processors of each security server, cause each security server to perform transmitting, with each content requested, an identifier of the security policy used to process each content.

18. The system of claim 14, wherein the instructions, when executed by the one or more processors of each security server, cause each security server to perform:
   recovering from an operational failure,
   after recovering from the operational failure:
      transmitting, to one or more other security servers of the plurality of security servers, an indication that recovery has occurred,
      receiving a current security policy, and
      processing content using the current security policy.

19. The system of claim 14, wherein the instructions, when executed by the one or more processors of each security server, cause each security server to perform, in response to receiving an indication that one or more other security servers have likely failed, adjusting a manner in which content is transformed using the current security policy.

20. The computer-implemented system of claim 14,
   wherein the content requested by the client computing devices reside on one or more origin content servers;
   wherein the plurality of security servers include one or more intermediary security servers;
   wherein the instructions, when executed by the one or more processors of each intermediary security server, cause each security server to process content that resides on the one or more origin content servers before such content is served to the client computing devices.

\* \* \* \* \*